June 21, 1932. L. H. CHURCH 1,864,295
GROUNDING FITTING
Filed June 14, 1930

Inventor
LEWIS H. CHURCH
By his Attorney
John M. Montstream

Patented June 21, 1932

1,864,295

UNITED STATES PATENT OFFICE

LEWIS H. CHURCH, OF ROSELLE, NEW JERSEY, ASSIGNOR TO THE THOMAS & BETTS CO., OF ELIZABETH, NEW JERSEY, A CORPORATION OF NEW JERSEY

GROUNDING FITTING

Application filed June 14, 1930. Serial No. 461,107.

This invention relates to grounding fittings by means of which a conduit system adapted to carry electrical wiring is electrically grounded to some grounded structure such as a water pipe.

An object of this invention is to construct a grounding fitting having means for the anchoring of an electrical conduct thereto and pipe clamping means consisting of a plurality of pipe clamping seats disposed in side by side arrangement upon the grounding fitting.

Another object of the invention is to provide a grounding fitting having means for anchoring a conduit thereto with a plurality of pipe clamping seats disposed in side by side arrangement and a single pipe clamping member for each of the seats to clamp a plurality of sizes of pipe to the grounding fitting member.

Other objects of the invention will be more apparent from the following description taken in connection with the drawing in which.

The grounding fitting of this invention is provided with conduit anchorage means whereby a conduit is firmly held and also electrically grounded to the grounding fitting so that the conduit system carrying the electrical wiring may be grounded through the fitting to some other structure which is preferably a water pipe. Water pipes are usually found in all constructions and afford a good electrical ground. The water pipe is firmly clamped to the grounding fitting so that good electrical contact is established between the conduit system and the grounded water pipe through the grounding fitting. Since a plurality of diameters of water pipe are utilized in buildings and construction work generally, the grounding fitting should be adapted to receive pipes of different diameters. In addition, means are provided to anchor a grounding wire to the grounding fitting so that the wire is also positively electrically grounded through the grounding fitting to the water pipe.

In the grounding fitting of this invention, a grounding fitting member 10 is provided with a ring 11 upon one end which is internally threaded to receive the threaded end of an electrical conduit C. The threaded ring 11 illustrates one type of conduit anchorage means and this invention contemplates any means whereby an electrical conduit may be anchored to the grounding fitting member.

Figure 1:
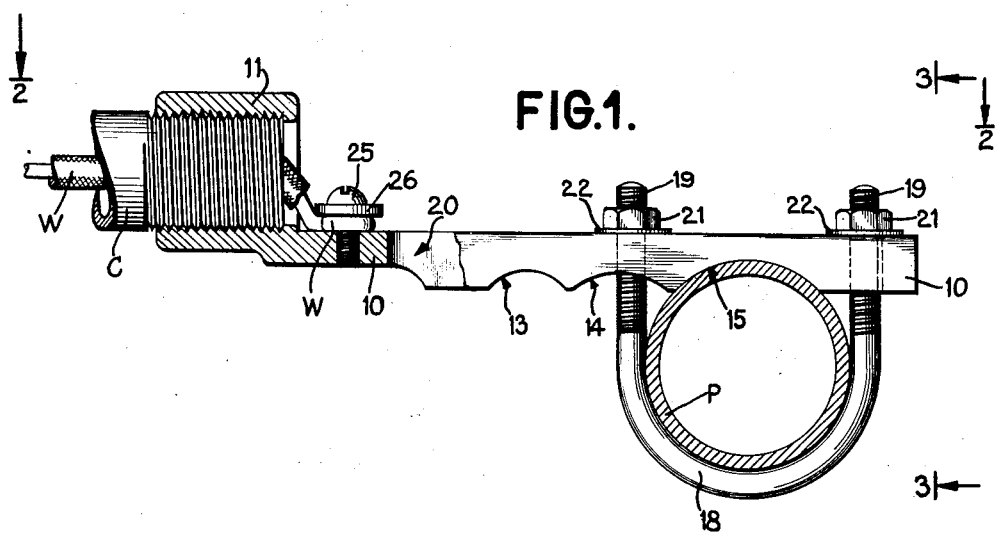
Figure 1 shows the grounding fitting with a section through the conduit anchorage means and a pipe clamped to the fitting.
Figure 2:
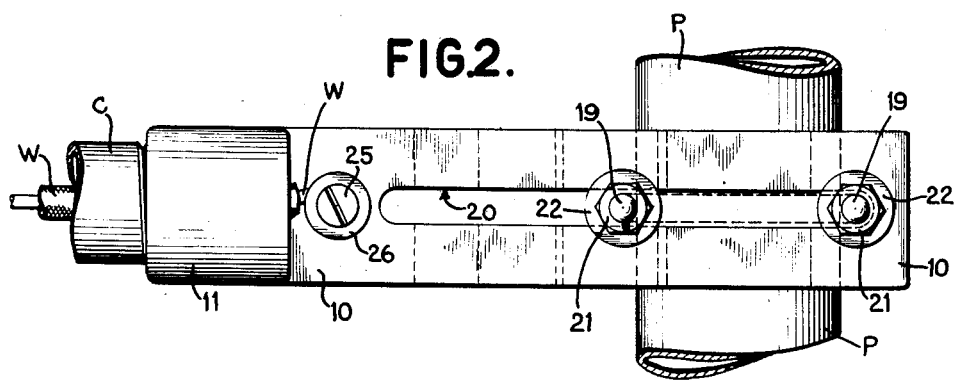
Figure 2 is another view of the grounding fitting of Figure 1 showing additional details of the pipe clamping means.
Figure 3:
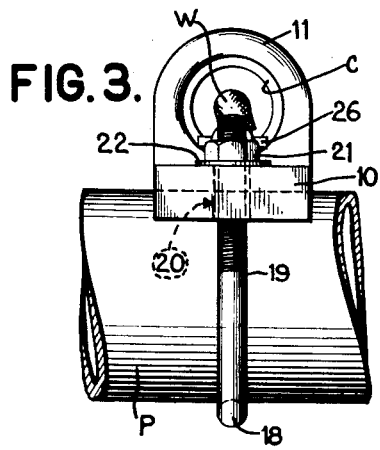
Figure 3 is an end view of the grounding fitting taken from line 3—3 of Figure 1.

The grounding fitting member 10 has a plurality of arcuate depressions or seats 13, 14 and 15 positioned in parallel, side by side arrangement upon the surface of the grounding fitting member. Each one of these arcuate seats are of a different curvature to receive a pipe of a diameter corresponding to the curvature of the seat and each seat is less than a semi-circle or embraces less than a semi-circle of the pipe's circumference. Although three such arcuate seats are shown upon the member, it is clear that additional seats may be provided in case such additional seats are desired in order to adapt the grounding fitting to receive an even greater number of pipes of different diameters. The grounding fitting member 10 is elongated so that sufficient surface is provided to receive several arcuate seats arranged side by side and parallel to each other so that the edges of adjacent seats are in close proximity. With the seats embracing less than a semi-circle of the pipe and placing the seats closely together, the elongated member 10 can be materially shortened in length with a consequent saving in material used and packing and storage space necessary without diminishing the area or extent of the grounding contact between the pipe P and the grounding fitting member 10. The saving in length of the grounding fitting member 10 is evident from Figure 1 which shows that the seats are so close together that it is impossible to clamp pipes in adjacent seats yet each seat is available to clamp a pipe of a different diameter.

A U-shaped pipe clamping means or yoke 18 embraces the pipe P or other grounded structure and clamps it firmly in one of the arcuate seats such as the seat 15, the arc of which corresponds to the circumference of the water pipe. The threaded shanks 19 of the U-shaped clamping member 18 project through a slot 20 extending longitudinally of the member and a nut 21 is threaded upon each shank to clamp the pipe P firmly to the grounding fitting member 10. Washers 22 may be provided to more positively bridge the slot 20 in case the nuts 21 do not afford sufficient contacting surface with the grounding fitting member. A screw 25 is threaded into the grounding fitting member 10 at any point adjacent to the ring 11 and a wire clamping washer 26 is mounted thereon to firmly clamp a wire W between the washer and the grounding fitting member 10 thereby establishing positive electrical connection between the wire and the grounding fitting.

Figure 4:
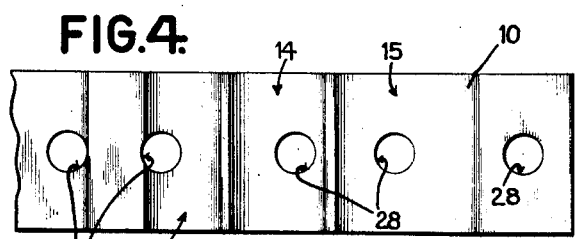
Figure 4 shows a construction whereby the pipe clamping means is received by the grounding fitting in a different manner from that shown in Figures 1 through 3.

A plurality of holes 28 shown in Figure 4, may be provided on either side of each arcuate seat 13, 14 and 15 to receive the shanks 19 of the pipe clamping member 18. These holes 28 may be substituted for the slot 20 to receive the shanks of the pipe clamping member when a pipe is to be clamped to the grounding fitting.

Having described my invention it is to be understood that the invention is not to be limited by any specific description of the construction herein or by the specific disclosure in the drawing, excepting as limited in the accompanying claims.

What is claimed is:

1. A grounding fitting comprising a member having conduit anchorage means thereon, a plurality of pipe clamping seats upon the member having a dimension adapted to embrace less than a semi-circle of the pipe and of different sizes positioned in parallel side by side arrangement with the edges of adjacent seats being in close proximity, and means to clamp a pipe to one of the seats.

2. A grounding fitting comprising a member having conduit anchorage means upon one end thereof, a plurality of arcuate seats having an arc less than a semi-circle and of different diameters positioned in parallel side by side arrangement upon the elongated member with the edges of adjacent seats being in close proximity, and means to clamp a pipe in one of the arcuate seats.

3. A grounding fitting comprising a member having conduit anchorage means thereon, a plurality of pipe clamping seats upon the member having a dimension adapted to embrace less than a semi-circle of the pipe and of different sizes positioned in parallel side by side arrangement with the edges of adjacent seats being in close proximity, a longitudinal slot in the clamping member, and means extending through the slot to clamp a pipe in one of the seats.

4. A grounding fitting comprising a member having conduit anchorage means thereon, a plurality of pipe clamping seats upon the member having a dimension adapted to embrace less than a semi-circle of the pipe and of different sizes positioned in parallel side by side arrangement with the edges of adjacent seats being in close proximity, a longitudinal slot in the clamping member, and a U-shaped clamping member having its ends extending through the slot to clamp a pipe in one of the seats.

5. A grounding fitting comprising a member having conduit anchorage means thereon, a plurality of pipe clamping seats upon the member having a dimension adapted to embrace less than a semi-circle of the pipe and of different sizes positioned in parallel side by side arrangement with the edges of adjacent seats being in close proximity, and a U-shaped clamping means extending through the member to clamp a pipe in one of the seats.

6. A grounding fitting comprising a member having conduit anchorage means thereon, a plurality of pipe clamping seats upon the member having a dimension adapted to embrace less than a semi-circle of the pipe and of different sizes positioned in parallel side by side arrangement with the edges of adjacent seats being in close proximity, clamping means extending through the member to clamp a pipe in one of the seats, and means to secure a grounding wire to the member.

7. A grounding fitting comprising an elongated member having a threaded ring at one end thereof to anchor a conduit therein, a plurality of arcuate seats having an arc less than a semi-circle and of different diameters indented in the elongated member and positioned in parallel side by side arrangement with the edges of adjacent seats being in close proximity, a slot extending longitudinally of the member and passing through the arcuate seats, and a U-shaped clamping yoke having its ends extending through the slot to clamp a pipe in one of the arcuate seats.

8. A grounding fitting comprising an elongated member having a threaded ring at one end thereof to anchor a conduit therein, a plurality of arcuate seats having an arc less than a semi-circle and of different diameters indented in the member and positioned in parallel side by side arrangement with the edges of adjacent seats being in close proximity, a pair of holes one upon either side of each arcuate seat, and a U-shaped clamping member having each end extending through a hole to clamp a pipe in one of the arcuate seats.

9. A grounding fitting comprising a member having substantial thickness, a conduit anchorage means carried thereby, a plurality of pipe clamping seats depressed into one side of the member having a dimension adapted to embrace less than a semi-circle of the pipe and of different sizes positioned in parallel side by side arrangement with the edges of adjacent seats being in close proximity, and means to clamp a pipe in one of the arcuate seats.

In testimony whereof I affix my signature.

LEWIS H. CHURCH.